(12) United States Patent
Kudo

(10) Patent No.: US 7,302,327 B2
(45) Date of Patent: Nov. 27, 2007

(54) VEHICLE DRIVING AID APPARATUS

(75) Inventor: Shinya Kudo, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 229 days.

(21) Appl. No.: 10/895,247

(22) Filed: Jul. 19, 2004

(65) Prior Publication Data

US 2005/0021204 A1    Jan. 27, 2005

(30) Foreign Application Priority Data

Jul. 25, 2003    (JP)    ............ P2003-201878

(51) Int. Cl.
*B62D 6/00*    (2006.01)
(52) U.S. Cl. ............ 701/41; 701/36; 180/6.2
(58) Field of Classification Search ............ 701/36, 701/300–302, 93, 41–44, 67; 340/425.5, 340/438, 439; 180/446, 6.2, 6.44, 6.6, 6.24, 180/234; 342/71
See application file for complete search history.

(56) References Cited

U.S. PATENT DOCUMENTS 5,236,335 A * 8/1993 Takeuchi et al. ............ 180/446
5,923,256 A * 7/1999 Satake et al. ............ 340/575
6,282,478 B1 * 8/2001 Akita ............ 701/70
6,697,722 B2 * 2/2004 Fujimori ............ 701/41
6,807,471 B2 * 10/2004 Fujimori ............ 701/41

FOREIGN PATENT DOCUMENTS

| EP | 0 605 902 A1 | 7/1994 |
| EP | 1 209 019 A2 | 5/2002 |
| JP | 10-315799 A1 | 12/1998 |
| JP | 2002-154345 A1 | 5/2002 |
| JP | 2004-34739 A1 | 2/2004 |
| WO | WO-02/25291 A2 | 3/2002 |

* cited by examiner

*Primary Examiner*—Yonel Beaulieu
(74) *Attorney, Agent, or Firm*—Darby & Darby

(57) ABSTRACT

A steering mechanism 1 is configured as a steering mechanism which allows an arbitrary relationship to be set between a steering mechanism unit 2 through which steering of a driver is input and a turning mechanism unit 3 for turning wheels 5, 5 to be turned, those units being controlled by an ECU 30 on a steer-by-wire basis. When alarm control to wake up the driver is performed according to a determination indicating a reduction of the wakefulness of the driver, the ECU 30 suspends the steer-by-wire control to control the turning mechanism unit 3 independently of the steering mechanism unit 2. As a result, even when an improper steering input is provided by the driver who is at a low level of wakefulness, it is possible to prevent such mis-steering from being reflected in driving.

21 Claims, 3 Drawing Sheets

VEHICLE DRIVING AID APPARATUS

This application claims foreign priority based on Japanese patent application No. JP-2003-201878, filed on Jul. 25, 2003, the contents of which, including the specification, drawings and abstract, are incorporated herein by reference.

BACKGROUND OF THE INVENTION

The present invention relates to a vehicle driving aid apparatus which determines the wakefulness of a driver and issues an alarm to wake up the driver or to concentrate the driver on driving.

For the purpose of maintaining safety of driving, many proposals have been made on vehicle driving aid apparatus which determine the wakefulness of a driver using signals representing behaviors of a vehicle such as a steering angle, signals representing physiological changes in a driver, and so on and which issues an alarm using sounds or light to wake up a driver when it determines a reduction of the wakefulness of the driver.

For example, JP-A-10-315799 discloses a technique in which the wakefulness of a driver is determined based on the state of opening of the driver's eyes and in which, when a reduction of the wakefulness of the driver is determined, an alarm sound having a moving acoustic image is output to wake up the driver who has been at a low level of wakefulness, the wake-up sound lasting for a long time.

However, it is sometimes difficult to maintain the safety of driving sufficiently only by issuing an alarm to wake up the driver as in the technique disclosed in JP-A-10-315799.

Specifically, mis-steering is likely to occur due to a mis-judgment or operational delay of a driver during the time required for the driver to recover from a state at a low level of wakefulness to a wakeful state, and such mis-steering can cause a significant deviation of the vehicle from the driving lane. In particular, when the acoustic image of an alarm sound is moved as described above, the driver's consciousness may concentrate on the moving direction of the acoustic image at the instant when the driver recovers from the state at a low level of wakefulness, and the alarm sound can induce mis-steering rather than prevent mis-steering of the driver. It is therefore necessary to take sufficient countermeasures to a deviation from a driving lane and so on.

SUMMARY OF THE INVENTION

The invention has been made taking the above-described situation into consideration, and it is an object of the invention to provide a vehicle driving aid apparatus capable of waking up a driver or concentrating the driver on driving while preventing improper steering of the driver from being reflected in driving, in particular, when the driver is at a low level of wakefulness.

In order to solve the above-described problem, the invention provides a vehicle driving aid apparatus comprises a steering mechanism which allows an arbitrary relationship to be set between the steering angle of a steering wheel and the turning angle of a turning wheels, a wakefulness determination part which determines wakefulness of the driver, an alarm controller which controls an alarm for awaking the driver when the wakefulness determination part determines a reduction of the wakefulness of the driver, and turning controller which controls the turning angle of the turning wheels independently of the steering angle of the steering wheel at least when the alarm controller controls the alarm.

DESCRIPTION OF THE PREFERRED EMBODIMENT

Figure 2:
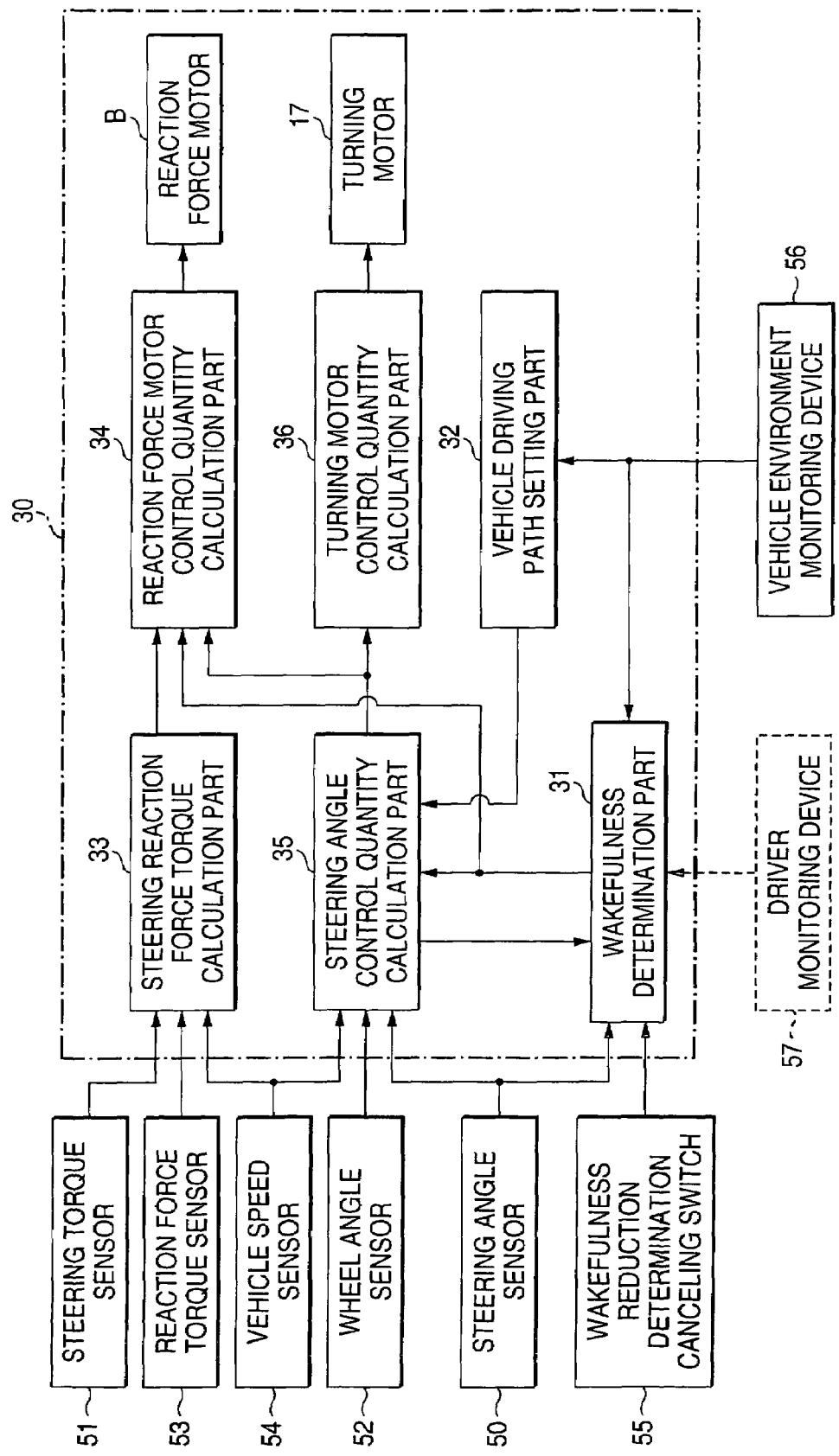
FIG. 2 is a functional block diagram showing major parts of a controller.
Figure 3:
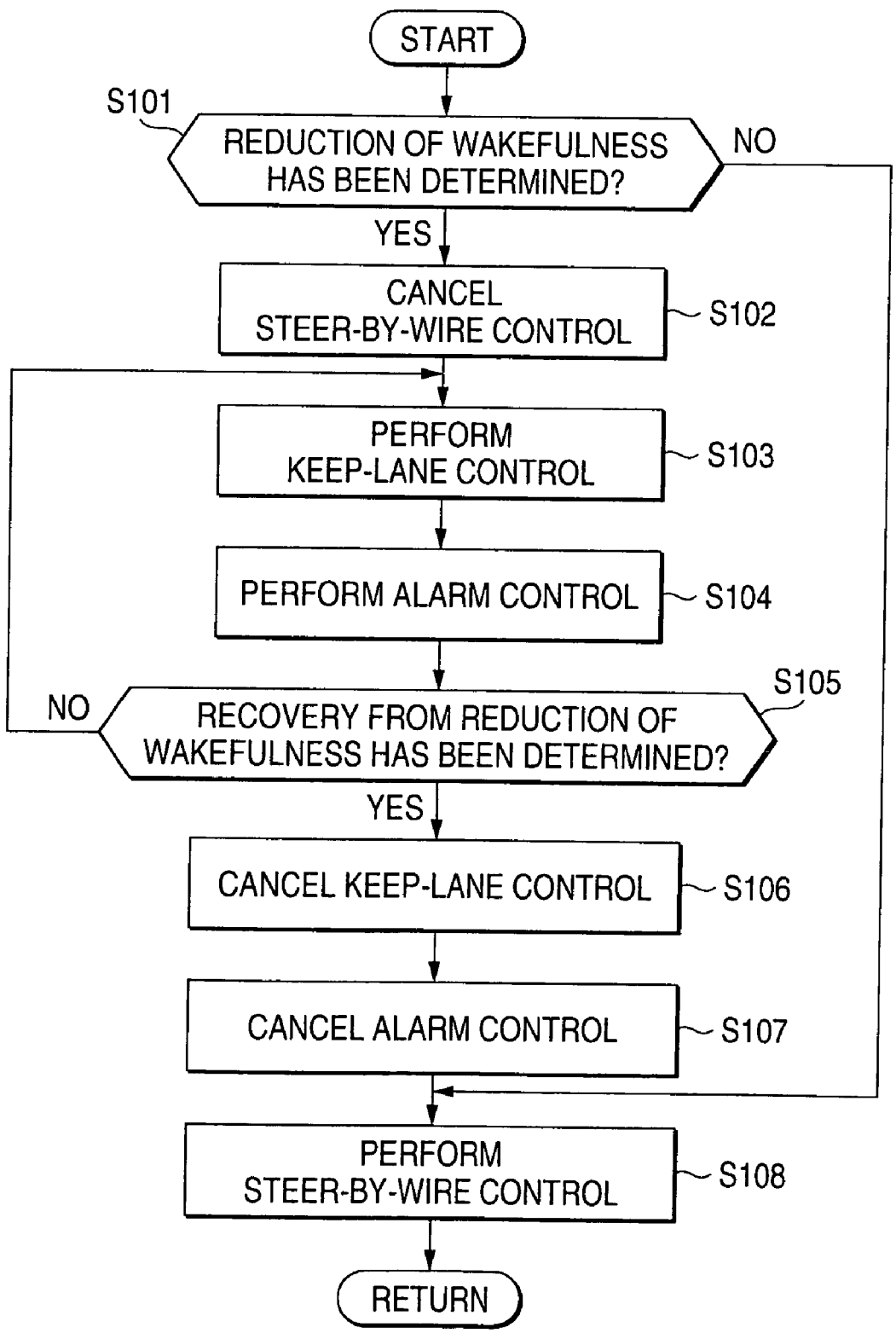
FIG. 3 is a flow chart showing a driving aid control routine.

An embodiment of the invention will now be described with reference to the drawings. The drawings relate to an embodiment of the invention, and FIG. 1 is a schematic configuration diagram showing major parts of a vehicle driving aid apparatus, FIG. 2 is a functional block diagram showing major parts of a controller, and FIG. 3 is a flow chart showing a driving aid control routine.

Figure 1:
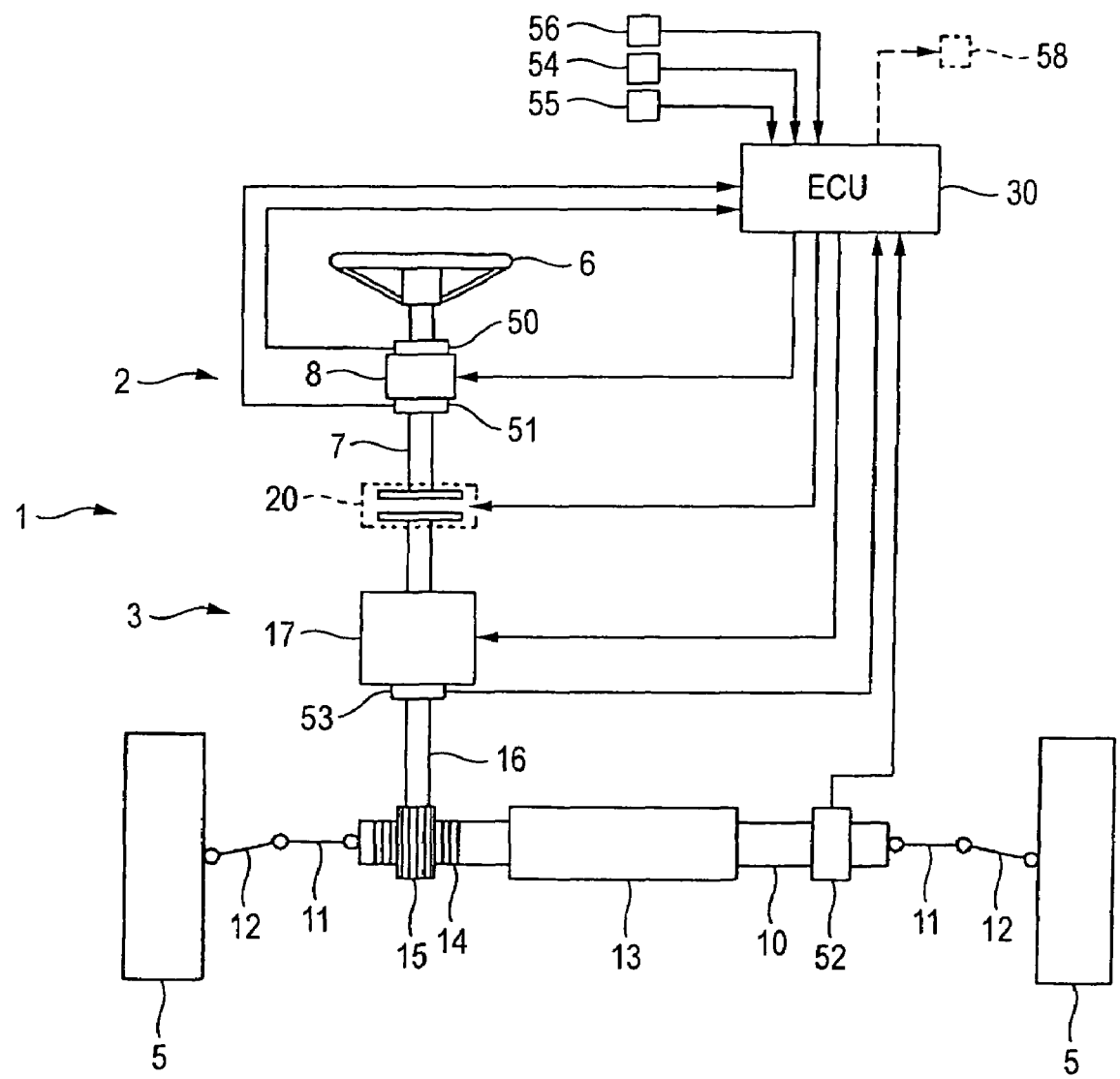
FIG. 1 is a schematic configuration diagram showing major parts of a vehicle driving aid apparatus.

In FIG. 1, reference numeral 1 represents a steering mechanism of an electrical power steering device. The steering mechanism 1 has a steering mechanism unit 2 through which steering inputs from a driver are supplied, and turning mechanism unit 3 for turning wheels 5, 5 to be turned. Those units are controlled for cooperation in a predetermined manner to realize a so-called steer-by-wire type electric power steering device.

The steering mechanism unit 2 is comprised of a steering wheel 6, a steering shaft 7 connected to the steering wheel 6, and a reaction force motor 8 as a reaction force applying device which is assembled on the steering shaft 7 in the middle thereof in a coaxial relationship with the shaft. The reaction force motor 8 is driven and controlled by an ECU (electronic control unit) 30 which will be described later. A driving force of the reaction force motor 8 is transmitted to the steering wheel 6 through the steering shaft 7.

The turning mechanism unit 3 is comprised of a rack shaft 10 provided such that it extends in the lateral direction of the vehicle body and knuckle arms 12, 12 connected to both ends of the rack shaft 10 through respective tie rods 11, 11, and the turning wheels 5, 5 are connected to the knuckle arms 12, 12, respectively.

The rack shaft 10 is supported on the vehicle body through a housing 13 such that it can move in the lateral direction of the vehicle. A rack gear 14 is provided on the rack shaft 10, and a pinion gear 15 is engaged with the rack gear 14. A pinion shaft 16 is connected to the pinion gear 15, and a turning motor 17 is assembled on the pinion shaft 16 in the middle thereof in a coaxial relationship with the shaft. The turning motor 17 is driven and controlled by the ECU 30, and a driving force of the turning motor 17 is transmitted to the rack shaft 10 through the pinion shaft 16, the pinion gear 15, and the rack gear 14 to turn the wheels 5, 5 to be turned.

Reference numeral 20 in the figure represents a clutch mechanism unit interposed between the steering shaft 7 and the pinion shaft 16, and the clutch mechanism unit 20 is controlled for engagement by the ECU 30 at the time of a failure of the reaction force motor 8 or turning motor 17.

As illustrated, connected to the ECU 30 are a steering angle sensor 50 for detecting the angle of steering of the steering wheel 6 performed by a driver, a steering torque sensor 51 for detecting the torque of the steering of the steering wheel 6 performed by the driver, a wheel angle sensor 52 for detecting the turning angle (wheel angle) of the turning wheels 5, 5, a reaction force torque sensor 53 for detecting the torque of a reaction force exerted on the turning wheels 5, 5 from the road surface, and a vehicle speed sensor 54. The ECU 50 drives and controls the reaction force motor 8 and the turning motor 17 based on inputs from those sensors such that they are in a predetermined relationship. That is, the ECU 30 controls the steering mechanism unit 2 and the turning mechanism unit 3 for cooperation based on a set arbitrary relationship between them (steer-by-wire control).

A vehicle environment monitoring device 56 as vehicle environment monitoring means is connected to the ECU 30 to input information such as information on left and right lane markings ahead of the vehicle from the vehicle environment monitoring device 56. For example, the vehicle environment monitoring device 56 is comprised of a stereoscopic camera which picks up images of objects outside the vehicle from different points of view, and the device performs a well-known stereoscopic imaging process to three-dimensionally recognize information on the environment of the vehicles such as information on left and right lane markings and three-dimensional objects. The vehicle environment monitoring device 56 is not limited to the use of a stereoscopic camera as described above.

For example, a device utilizing a single-lens camera or laser radar may obviously be used. When vehicle environment information recognized by the vehicle environment monitoring device 56 is input, the ECU 30 determines the concentration including the wakefulness of the driver based on the input information. When it is determined that there is a reduction of the wakefulness, as the concentration, of the driver, the ECU stops controlling the steering mechanism unit 2 and the turning mechanism unit 3 for cooperation with each other, recognizes a path of driving for the vehicle according to the vehicle environment monitoring device 56, controls turning performed by the turning mechanism unit 3 (keep-lane control), and performs alarm control to wake up the driver using the steering mechanism unit 2.

Specifically, the ECU 30 is primarily comprised of a microcomputer and peripheral devices thereof which constitute functional parts such as a wakefulness determination part 31, a vehicle driving path setting part 32, a steering reaction force torque calculation part 33, a reaction force motor control quantity calculation part 34, a steering angle control quantity calculation part 35, and a turning motor control quantity calculation part 36 (see FIG. 2). The ECU 30 realizes functions of the wakefulness determination means, the alarm controller, and the turning controller with those functional parts.

For example, the wakefulness determination part 31 continuously detects the quantity of movement of the vehicle in the width direction thereof from a relationship between the left and right lane markings and the position of the vehicle, performs frequency transformation of the detected quantity of movement to obtain each frequency component power, and determines any reduction of the wakefulness of the driver based on the frequency component power (for example, see JP-A-2002-154345 for details).

Instead of determination based on behaviors of a vehicle as described above, the determination of a reduction of wakefulness at the wakefulness determination part 31 may be made based on results of monitoring by a driver monitoring device 57 which monitors physiological changes in a driver such as changes in blinking, brain waves, or activities of potential on the skin.

While the wakefulness determination part 31 may perform determination on recovery of wakefulness, which follows the determination of a reduction of wakefulness, based on behaviors of the vehicle or physiological changes in the driver as described above, the determination may alternatively be made based on various operations of the driver. For example, the wakefulness determination part 31 may determine that the wakefulness of the driver has been recovered when it detects an operation on a switch such as a wakefulness reduction determination canceling switch 55 that is optionally connected to the ECU 30. The wakefulness determination part 31 may alternatively determine that the wakefulness of the driver has been recovered, for example, when it detects a driver's input of proper steering in a direction corresponding to the turning direction of the turning wheels 5, 5 during keep-lane control. Specifically, the wakefulness determination part 31 may determine that the wakefulness of the driver has been recovered, for example, when the angle of the driver's steering detected by the steering angle sensor 50 is in predetermined agreement with a steering angle control quantity (which will be described later) calculated by the steering angle control quantity calculation part 35 during keep-lane control.

For example, information on left and right lane markings detected by the vehicle environment monitoring device 56 is input to the vehicle driving path setting part 32 which sets a path of driving for the vehicle based on the lane marking information. Specifically, the vehicle driving path setting part 32 sets a driving path for the vehicle along the position in the middle of the left and right lane markings, for example.

The torque of steering of the driver detected by the steering torque sensor 51, the torque of a reaction force from the road surface detected by the reaction force torque sensor 53, and the speed of the vehicle detected by the vehicle speed sensor 54 are input to the steering reaction force torque calculation part 33 which calculates the torque of a steering reaction force that is exerted on the steering wheel 6 based on the inputs.

The torque of the steering reaction force calculated by the steering reaction force torque calculation part 33 is input to the reaction force motor control quantity calculation part 34 which calculates a reaction force motor control quantity based on the torque of the steering reaction force to drive and control the reaction force motor 8.

The result of determination on the wakefulness of the driver made by the wakefulness determination part 31 is also input to the reaction force motor control quantity calculation part 34. When a determination result indicating a reduction of the wakefulness of the driver is input from the wakefulness determination part 31, the reaction force motor control quantity calculation part 34 stops calculating the reaction force motor control quantity based on the torque of the steering reaction force and calculates a reaction force motor control quantity to vibrate the steering wheel 6 with a predetermined amplitude and vibration frequency. That is, when the wakefulness determination part 31 determines a reduction of the wakefulness of the driver, the reaction force motor control quantity calculation part 34 vibrates the steering wheel 6 through the reaction force motor 8 to perform alarm control for waking up the driver.

In order to reduce any uncomfortable feel that the driver may have, the direction of the vibration of the steering wheel 6 is preferably corresponding to the turning direction of the turning wheels 5, 5 at the time of alarming. More preferably, the quantity of vibration (the quantity of alarm) of the steering angle 6 is varied depending on the state of deviation of the vehicle from the driving path for the vehicle. For example, such control can be carried out by inputting a turning angle control quantity for keep-lane control to the reaction force motor control quantity calculation part 34 from the turning angle control quantity calculation part 35 and setting the reaction force motor control quantity such that it varies in accordance with the steering angle control quantity.

The angle of steering of the driver detected by the steering angle sensor 50, the turning angle of the turning wheels 5, 5 detected by the wheel angle sensor 52, and the speed of the vehicle detected by the vehicle speed sensor 54 are input to the turning angle control quantity calculation part 35 which calculates a turning angle control quantity for the wheels 5, 5 to be turned based on the inputs. That is, the turning angle control quantity calculation part 35 calculates a turning angle control quantity for performing steer-by-wire control between the turning mechanism unit 3 and the steering mechanism unit 2 based on the angle of steering of the driver, the turning angle of the turning wheels 5, 5, and the vehicle speed.

The result of determination on the wakefulness of the driver made by the wakefulness determination part 31 and information on the driving path for the vehicle set by the vehicle driving path setting part 32 are input to the turning angle control quantity calculation part 35. When a determination result indicating a reduction of the wakefulness of the driver is input from the wakefulness determination part 31, the turning angle control quantity calculation part 35 suspends the calculation of a turning angle control quantity for steer-by-wire control and calculates a steering angle control quantity for keep-lane control for controlling the driving of the vehicle along the driving path for the vehicle. That is, the turning angle control quantity calculation part 35 calculates a turning angle control quantity for automatically controlling the turning wheels 5, 5 independently of the angle of steering of the driver based on the information on the driving path for the vehicle, the turning angle of the turning wheels 5, 5, and the vehicle speed.

The turning angle control quantity calculated by the turning angle control quantity calculation part 35 is input to the turning motor control quantity calculation part 36 which calculates a turning motor control quantity based on the turning angle control quantity to drive and control the turning motor 17.

Next, a driving aid control routine executed by the ECU 30 will be described with reference to the flow chart in FIG. 3.

This routine is executed at each preset time. When the routine is started, the ECU 30 determines the wakefulness of the driver at step S101 and proceeds to step S108 when it is determined that the driver is in a wakeful state.

When the routine proceeds from step S101 to step S102 according to a determination that the driver is in a state at a low level of wakefulness, the ECU 30 cancels steer-by-wire control over the steering mechanism unit 2 and the turning mechanism unit 3. At step S103, keep-lane control to control the vehicle for driving along the driving path for the vehicle is performed through the turning mechanism unit 3. Alarm control for waking up the driver is performed through the turning mechanism unit 3 at step S104, and the process thereafter proceeds to step S105.

The ECU 30 determines the wakefulness of the driver at step S105 and returns to step S103 when it determines that the driver is still in the state at a low level of wakefulness.

When the routine proceeds from step S105 to step S106 according to a determination that the driver has recovered from the state at a low level of wakefulness to the wakeful state, the ECU 30 cancels the keep-lane control through the turning mechanism unit 3 and cancels the alarm control through the steering mechanism unit 2 at step S107, the routine thereafter proceeding to step S108.

When the routine proceeds from step S101 or S107 to step S108, the ECU 30 executes steer-by-wire control over the steering mechanism unit 2 and the turning mechanism unit 3 and exits the routine thereafter.

In such an embodiment, when alarm control to wake up a driver is performed according to a determination indicating a reduction of the wakefulness of the driver, the turning of the turning wheels 5, 5 is controlled independently of the steering angle of the steering wheel 6. As a result, even in a case wherein an improper steering input is provided by the driver when the driver is at a low level of wakefulness, the safety of driving can be maintained by preventing such mis-steering from being reflected in driving.

In this case, a deviation from the driving lane can be effectively prevented by setting a driving path for the vehicle based on vehicle environment information detected by the vehicle environment monitoring device 56 and controlling the turning of the turning wheels 5, 5 along the driving path for the vehicle (i.e., by performing keep-lane control).

By controlling the turning of the turning wheels 5, 5 independently of the steering angle of the steering wheel 6 when alarm control is performed, the steering wheel 6 can be used to issue an alarm for waking up the driver. The use of vibration of the steering wheel 6 as an alarm for the driver makes it possible to wake up the driver with high reliability using a stimulus to the tactile sense.

When the driver is alarmed by the vibration of the steering wheel 6, the direction of the vibration of the steering wheel 6 is made to coincide with the turning direction of the turning wheels 5, 5, which makes it possible to reduce any uncomfortable feel that the driver may receive from the alarm.

Further, when the driver is alarmed by the vibration of the steering wheel 6, the quantity of vibration of the steering wheel 6 is varied according to the state of deviation of the vehicle from the driving path for the vehicle, which makes it possible to reduce any uncomfortable feel that the driver may receive from the alarm.

When a driver's input of proper steering in a direction corresponding to the turning direction of the turning wheels 5, 5 for keep-lane control is detected as a result of determination of the wakefulness of the driver, it may be determined that the driver has recovered from a state at a low level of wakefulness, which makes it possible to determine the wakefulness of the driver with higher accuracy. Specifically, a steering input from the driver is used for the determination of recovery from a state at a low level of wakefulness, which allows an intention of the driver in a wakeful state to be directly reflected in the determination to improve the accuracy of the determination of wakefulness.

The alarm for waking up a driver according to the invention is not limited to vibration of the steering wheel 6. For example, an alarming device 58 may be connected to the ECU 30 as indicated by a broken line in FIG. 1 to wake up a driver by outputting sounds or light from the alarming device 58. Obviously, such an alarm utilizing sounds or light may be combined with the vibration of the steering wheel 6.

A driver can be alarmed even in the case of a vehicle having no vehicle environment monitoring device by disconnecting the turning mechanism unit 3 from the steering mechanism unit 2 for a very short time (or suspending steer-by-wire control) and vibrating the steering wheel 6 during the period. In this case, the control over the turning of the turning mechanism unit 3 may be suspended for such a short time that no problem occurs in driving. Alternatively, the control may be appropriately performed based on the yaw rate of the vehicle.

As described above, according to the invention, turning wheels are controlled independently of the steering angle of a steering wheel when alarm control is performed to wake up the driver, which makes it possible to wake up the driver while preventing improper steering from being reflected in driving when the driver is at a low level of wakefulness.

What is claimed is:

1. A vehicle driving aid apparatus comprising:
   a steering mechanism, wherein a relationship between a steering angle of a steering wheel and a turning angle of turning wheels is arbitrarily set;
   a wakefulness determination part for determining wakefulness of a driver;
   an alarm controller that controls an alarm for awaking the driver when the wakefulness determination part determines a reduction of the wakefulness of the driver; and
   a turning controller for suspending the steering wheel from controlling the turning wheels and controlling the turning angle of the turning wheels independently of the steering angle of the steering wheel at least when the alarm controller controls the alarm.

2. The vehicle driving aid apparatus according to claim 1, wherein the steering mechanism includes a reaction force applying device for applying a steering reaction force to the steering wheel; and
   the alarm controller controls the reaction force applying device to vibrate the steering wheel when the wakefulness determination part determines a reduction of the wakefulness of the driver.

3. The vehicle driving aid apparatus according to claim 2, wherein the alarm controller vibrates the steering wheel in a direction corresponding to a turning direction of the turning wheels controlled by the turning controller.

4. The vehicle apparatus according to claim 1, wherein the wakefulness determination part determines that the driver has recovered from the state at a low level of wakefulness when the wakefulness determination part detects a driver's input of proper steering in the direction corresponding to the turning direction of the turning wheels controlled by the turning controller.

5. The vehicle driving aid apparatus according to claim 1, further comprising a vehicle environment monitoring device for detecting a vehicle environment information,
   wherein the turning controller controls the turning wheels along a driving path of the vehicle based on the vehicle environment information.

6. The vehicle driving aid apparatus according to claim 5, wherein the alarm controller varies the quantity of the alarm according to the state of deviation of the vehicle from the driving path.

7. The vehicle driving aid apparatus according to claim 1, wherein the steering mechanism comprises a steering mechanism unit and a turning mechanism unit, and the steering mechanism unit comprises a reaction force applying device, and a turning mechanism unit comprises a turning motor.

8. The vehicle driving aid apparatus according to claim 7, wherein the reaction force applying device comprises a reaction force motor coaxially assembled on a steering shaft.

9. The vehicle driving aid apparatus according to claim 1, further comprising a vehicle environment monitoring device for detecting a vehicle environment information,
wherein wakefulness determination part determines the wakefulness of the driver based on the vehicle environment information.

10. The vehicle driving aid apparatus according to claim 1, further comprising a driver monitoring device for monitoring physiological changes in a driver,
   wherein wakefulness determination part determines the wakefulness of the driver based on the physiological changes in the driver monitored by the driver monitoring device.

11. A vehicle driving aid apparatus comprising:
   a steering mechanism for turning wheels at a turning angle corresponding to a steering angle of a steering wheel, a relationship between the steering angle of the steering wheel and the turning angle being arbitrarily set;
   a determination part for determining driver's concentration to the driving the vehicle;
   an alarm controller for controlling an alarm to concentrate the driver on driving the vehicle when the determination part determines a reduction of the driver's concentration to the driving the vehicle; and
   a turning controller suspending the steering wheel from controlling the turning wheels and for controlling the turning angle of the turning wheels independently of the steering angle of the steering wheel at least when the alarm controller controls the alarm.

12. The vehicle driving aid apparatus according to claim 11, wherein the determination part determines the driver's concentration by determining the wakefulness of the driver.

13. The vehicle driving aid apparatus according to claim 12, wherein the alarm controller vibrates the steering wheel in a direction corresponding to a turning direction of the turning wheels controlled by the turning controller.

14. A vehicle driving aid apparatus comprising:
   a steering mechanism for turning wheels at a turning angle corresponding to a steering angle of a steering wheels, a relationship between the steering angle of the steering wheel and the turning angle being arbitrarily set;
   a determination part for determining driver's concentration to the driving the vehicle;
   an alarm controller for controlling an alarm to concentrate the drive on driving the vehicle when the determination part determines a reduction of the driver's concentration to the driving the vehicle;
   wherein said alarm controller vibrates the steering wheel, for concentrating the driver on driving, in a direction corresponding to a turning direction of the turning wheels, independently of the steering angle of the steering wheels; and
   a turning controller for suspending the steering wheel from controlling the turning wheels and controlling the turning angle of the turning wheels independently of the steering angle of the steering wheel at least when the alarm controller controls the alarm.

15. The vehicle driving aid apparatus according to claim 14, wherein the determination part determines the driver's concentration by determining the wakefulness of the driver.

16. The vehicle driving aid apparatus according to claim 1, further comprising:
   a steering shaft connected to the steering wheel;
   a pinion shaft connected to the turning wheels; and
   a clutch mechanism interposed between the steering shaft and the pinion shaft.

17. The vehicle driving aid apparatus according to claim 16, further comprising a reaction force motor coaxially assembled on the steering shaft for applying a steering reaction force to the steering wheel.

18. The vehicle driving aid apparatus according to claim 11, further comprising:
   a steering shaft connected to the steering wheel;
   a pinion shaft connected to the turning wheels; and
   a clutch mechanism interposed between the steering shaft and the pinion shaft.

19. The vehicle driving aid apparatus according to claim 18, further comprising a reaction force motor coaxially assembled on the steering shaft for applying a steering reaction force to the steering wheel.

20. The vehicle driving aid apparatus according to claim 14, further comprising:
   a steering shaft connected to the steering wheel;
   a pinion shaft connected to the turning wheels; and
   a clutch mechanism interposed between the steering shaft and the pinion shaft.

21. The vehicle driving aid apparatus according to claim 20, further comprising a reaction force motor coaxially assembled on the steering shaft for applying a steering reaction force to the steering wheel.

\* \* \* \* \*